United States Patent [19]

Mihail et al.

[11] 3,820,895

[45] June 28, 1974

[54] METHOD AND APPARATUS FOR MENSURATION OF THREE-DIMENSIONAL OBJECTS AND OF STEREOMODELS OF SUCH OBJECTS

[75] Inventors: Edward M. Mihail; Warren H. Stevenson; Maurice K. Kurtz, Jr., all of Lafayette, Ind.

[73] Assignee: The United States of America as represented by the Secretary of the Army, Washington, D.C.

[22] Filed: May 24, 1971

[21] Appl. No.: 146,032

[52] U.S. Cl. .................................. 356/2, 350/3.5
[51] Int. Cl. ...................... G01c 11/12, G02b 27/02
[58] Field of Search ................. 350/136, 3.5; 356/2

[56] References Cited
UNITED STATES PATENTS

| | | | |
|---|---|---|---|
| 2,589,824 | 3/1952 | Kuipers | 356/2 |
| 3,361,031 | 1/1968 | Stroud | 350/96 B X |
| 3,445,855 | 5/1969 | Grant | 350/3.5 X |
| 3,598,484 | 8/1971 | Redman | 350/3.5 X |
| 3,675,012 | 7/1972 | Derderian et al. | 350/3.5 X |
| 3,680,078 | 7/1972 | Baskin et al. | 350/96 B UX |
| 3,687,534 | 8/1972 | deMontremy | 350/96 B UX |

OTHER PUBLICATIONS

"Holographic Panoramic Stereograms, etc.," by D. J. DeBitetto, Applied Optics, Vol. 8, No. 8, August 1969, pg. 1740–1741.

*Primary Examiner*—Ronald L. Wibert
*Assistant Examiner*—Paul K. Godwin
*Attorney, Agent, or Firm*—James E. Noble; William G. Gapcynski; Lawrence A. Neureither

[57] ABSTRACT

A method and apparatus for

1. Accurate mensuration of a three-dimensional object by insertion of a self-illuminated mark in the virtual image produced when a hologram of the object is illuminated, with X, Y, Z planes measurement means connected to said mark including means for recording said X, Y, Z coordinate, and 2. Construction of a holographic stereomodel from either diapositive transparencies or photographic prints using two simultaneous reference beams during reconstruction.

6 Claims, 35 Drawing Figures

FIG. 4a
a) PHOTOGRAMMETRIC CASE: POINTS 1 AND 2 CAN NOT BE SEPARATED AND SHADOWS EXIST. OBSERVER'S EYES ARE FIXED IN SPACE.
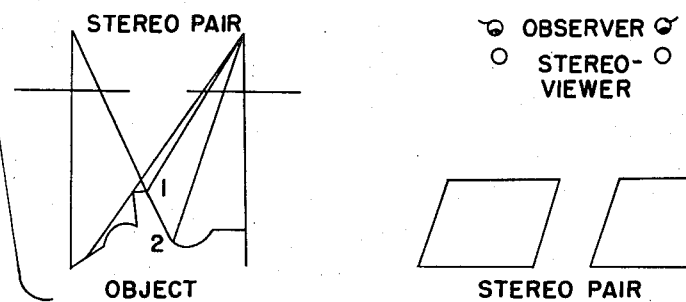
b) HOLOGRAPHIC CASE: POINTS 1 AND 2 ARE BOTH RECORDED ON THE HOLOGRAM. OBSERVER CAN MOVE HIS EYES IN SPACE TO SEE ANY POINT ON THE OBJECT.
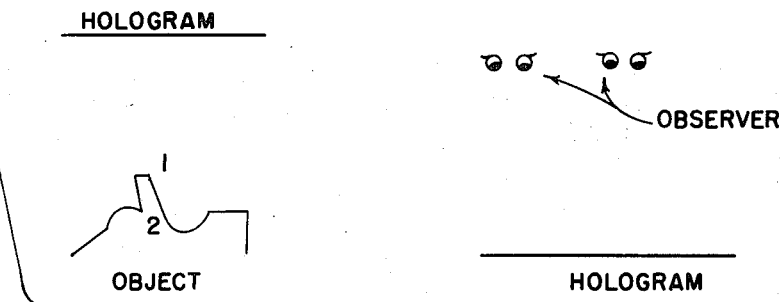
FIG. 4b RECONSTRUCTION BEAM ANGLE (BETA$_c$)
BETA$_r$ = 50°
BETA$_o$ = 0°

——— ORIGINAL POSITION
--- NEW POSITION

——— ORIGINAL POSITION
--- NEW POSITION

——— ORIGINAL POSITION
--- NEW POSITION

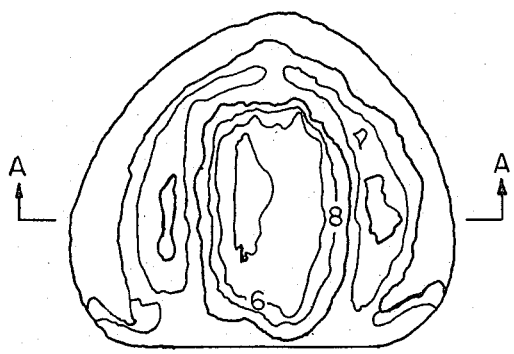
FIG. 13
SECTION A-A
FIG. 14
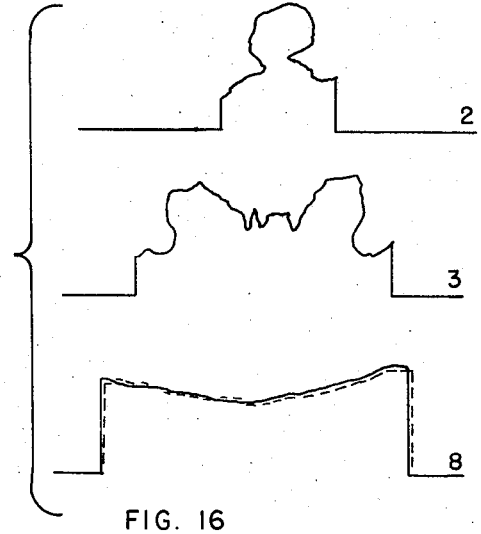
FIG. 16
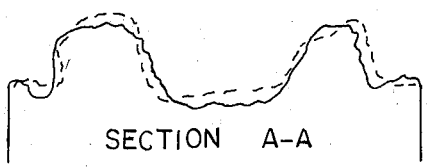
| POINT | ELEVATION – mm | |
|---|---|---|
| 0 | 0.00 | DATUM |
| 1 | 20.03 | |
| 2 | 20.30 | |
| 3 | 17.90 | |
| 4 | 20.31 | |
| 5 | 20.73 | |
| 6 | 1.65 | |
| 7 | 7.53 | |
FIG. 15
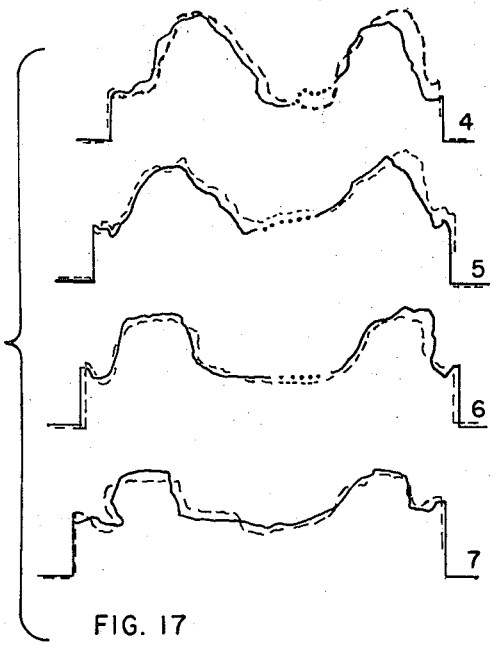
FIG. 17
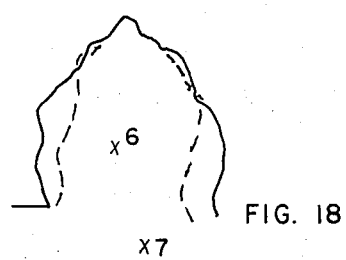
FIG. 18

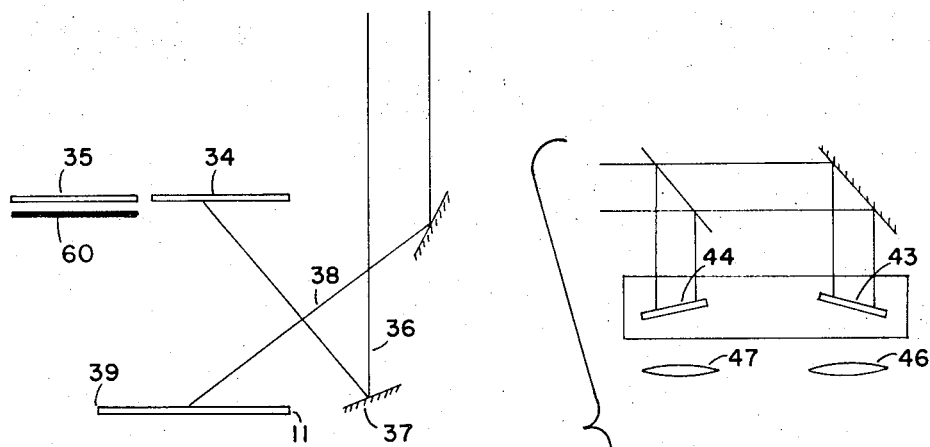
FIG. 20
FIG. 23
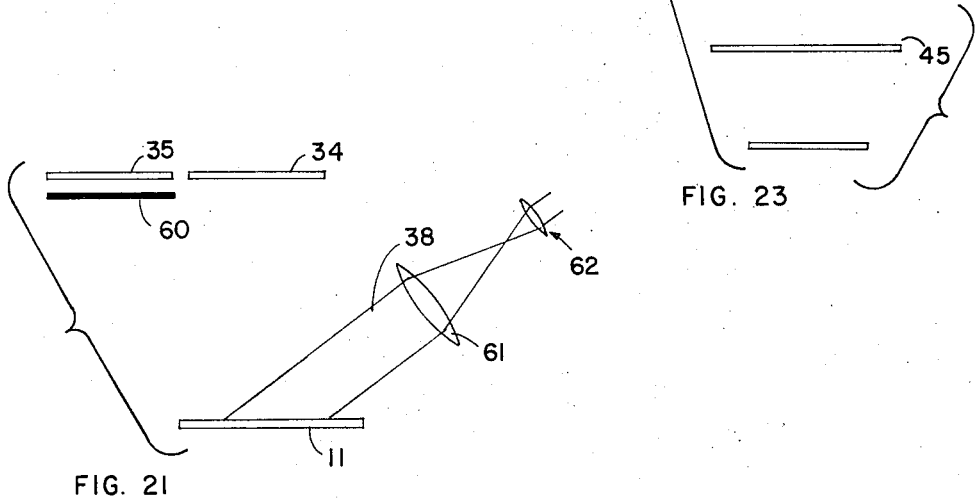
FIG. 21

METHOD AND APPARATUS FOR MENSURATION OF THREE-DIMENSIONAL OBJECTS AND OF STEREOMODELS OF SUCH OBJECTS

BACKGROUND OF THE INVENTION

Photogrammetrists have, for decades, used at least a stereopair to reconstruct a three-dimensional model. This method, which is the standard in the art, is expensive to practice with accuracy (large precision machines being required for best results) and requires storage of bulky stereo-pictures (necessarily substantial duplicates) as well as the machinery required for reading them.

A photograph records the intensity of the incident light, which is the time average of the square of the amplitude. The light energy incident on the undeveloped film needs to be focused which necessitates the use of lenses. In this case problems of aberrations and distortions arise which are costly to eliminate. In addition, the use of lenses presents a problem with depth of field especially in close-range work.

Photogrammetric stereomodels can be measured mainly because of the existence of parallax between conjugate images in overlapping photographs. All methods of precisely measuring photogrammetric stereomodels involve relatively large and expensive equipment. Thus both equipment and storage limitations combined make present terrain map-making procedures highly specialized and expensive endeavors.

Another method of making a composite data recordation is by means of a hologram. Holography was invented by Gabor in 1948 as a means of improving the resolution of electron microscopes beyond the then current resolution limit of 5 nanometers. Gabor hoped to use his system of wavefront reconstruction, as holography was first called, to produce large magnifications.

In order to achieve the desired image, the object was recorded by use of mutually coherent object and reference light beams. The two beams interfered and the resulting interference pattern was recorded on a photographic plate. After development, the image could be viewed by illuminating the plate with a duplicate of the reference beam.

The early holograms, such as those of Gabor, Rogers, Baez and El-Sum, never attained their theoretical promise. In all those holograms the reference beam was in line with the object during recording. When illuminated for reconstruction, two images were formed in line with the observer. Regardless of which image the observer looked at, the other one would also be present but out of focus.

Since lasers had not been invented at that time, gas discharge light sources had to be used. These lights had low output power and poor coherence. The low coherence and the use of the on-axis reference beam limited the objects to opaque letters or figures on a transparent background. Also the figures could only take up a small part of the total area of the background so that the reference beam could be transmitted to the plate. Due to the above limitations and poor resolution, interest in holography died off until it was revived by the work of Leith and Upatnieks at the University of Michigan.

In 1962 Leith and Upatnieks published a paper showing the similarity between holography and communications theory. Borrowing the principle of modulating a signal by use of a carrier wave from communications theory, they proposed that an off-axis reference beam could be used to produce holograms, thus alleviating the problem of twin images encountered in the axial reference beam configuration. Their first holograms while not of the quality presently attainable, verified their propositions. Soon after their first paper they announced the production of holograms of both continuous tone transparencies and of solid three-dimensional objects.

At first Leith and Upatnieks were hampered just like Gabor by the lack of good light source. In 1963 lasers became more readily available and the problem of a light source was solved. The long coherence length of the laser allowed them to make holograms of three-dimensional objects. No one, as far as the inventors know has successfully applied mensuration techniques to holograms.

Holography was originally called wavefront reconstruction since the hologram reproduces the wavefront that originally came from the object to the plate. A hologram records both the amplitude and phase from the incoming light and reconstructs these components when viewed. Since the hologram records both the amplitude and the phase, there is no need for focusing. In addition, it is possible to treat the image produced by a hologram by optical filtering techniques. This is of great value to those working with optical correlation equipment.

If the reference beam is passed through a diffuser or is reflected off a diffused object before striking the plate, the hologram acquires another interesting property. It is now possible to break the hologram and to see the whole object in one of the pieces. If you want four people to have four almost identical holograms, all you need to do is make your hologram and cut it into four parts. However, this has one serious drawback in that the resolution of the hologram decreases as the pieces decrease in size. Therefore, if the resolution is critical, it would be inadvisable to break up the hologram.

In viewing a hologram the viewer can move about within certain limits. If at one point one object obscures another, the latter can often be seen by simply moving the viewing point. The ability of changing the viewing point is however constrained by the physical size of the hologram. This ability to see obscured objects is totally missing in photogrammetric stereomodels. If one conjugate image of an object is missing from a stereo pair, it is impossible to determine the position of the object from that stereo pair. The shadowed areas which are lost in photogrammetry can often be seen in a hologram of the same object.

Several years ago some investigators developed techniques for holographically recording overlapping photographs in such a manner that three-dimensions could be perceived when viewing the holographic images of the photographs. Generally this was accomplished by one of two methods:

1. An optically induced angular (or linear) separation of the light from each photographic image such that each eye received light from a different photograph.

2. A separate holographic recording of each photograph with the holograms spaced at interpupillary distance for viewing.

Usually these methods involved a lens system, which could also be holographically recorded. The lens provided some magnification together with ease of viewing, much in the same manner as the familiar lens stereoscope or the popular aids for viewing stereograms which are a stereopair printed side-by-side after being properly oriented. In the holographic system one views holographic virtual images of the photographic stereogram in such a manner that a separate view is seen by each eye. The brain informs the observer that he sees a subjective stereomodel at the position where the eyes converge. The optics assist the eye in accomodating to the actual distance to the virtual image. For purposes of identification we will categorize these early concepts as holographic stereoscopes. To see the photographic images one looks through a lens system.

The limitations of the "holographic stereogram/stereoscope" systems are significant to the one who is interested in mapping from the imagery. Although a spectacular three-dimensional view can be obtained, the image quality and the model geometry is below the standard required for the use of photogrammetric mensuration techniques. The reasons are as follows:

1. The images are limited in their resolution because they depend on photographic prints or diffusely illuminated diapositive transparencies, neither of which can provide the resolution obtainable by direct viewing of the original imagery or a good glass plate contact print thereof.

2. The photographs had to be tilt free (or rectified) when they were holographically recorded and of the same scale.

3. The systems did not lend themselves to a rigorous relative orientation procedure needed to remove model distortions or to fine adjustments during viewing to remove residual y-parallax.

4. A plate that was damaged in any part became useless.

5. Limitation on base to height ratios possible.

In the early systems such relative orientation as was performed was achieved by meticulous replacement of the photographs in the geometrical arrangement used during the taking. It was indeed remarkable that in this manner holograms were synthesized by holographically recording a large array of overlapping photographs, each pair of which provided a different perspective as does a true (direct) hologram of an object. Unfortunately attempts to form suitable holographic stereograms from an arbitrary pair of aerial photographs were less than satisfactory because of residual y-parallax. This could not be easily removed and hence precluded mapping from the perceived stereomodel. Although the eye accomodated the y-parallax in the model the measuring mark inserted in the model space split vertically.

During the recording of the holographic stereogram separate holograms record information about each photograph, but only one reference beam is used because both holograms are on a single plate. By dividing the reconstruction beam used for viewing it is possible to adjust that portion going to a single hologram to remove y-parallax. This is an involved procedure which can introduce unknown model distortions, particularly if divergent beams are used. In addition these holograms are very angle sensitive and exhibit an image shift due to emulsion shrinkage. It is therefore impractical to produce photogrammetric quality stereomodels using this approach because of the distortion and parallax problems.

SUMMARY OF THE INVENTION

One object of the invention is the realization and use of apparatus to quantitatively measure the virtual or real image so tantalizingly reproduced by a hologram.

This object is accomplished by physically inserting a self-illuminated point light source into the space occupied by the virtual image produced by a hologram. This is possible without obstructing the reconstruction light beam and permits the mensuration of the object in a way not feasible with a real image produced by a hologram because the diffracted light from the plate is intercepted by the apparatus carrying the measuring mark. The light source so inserted must be capable of three-dimensional manipulation plus accurate, distortion free, mensuration of the coordinates obtained by movement of the dot from point to point on the virtual image of the object being measured. This is accomplished by the combination of a Wild A7 autograph for example, and EK5 digitizer. A bracket is inserted between the gear boxes of said pieces of equipment in which a hologram is placed. The laser is placed on the plotting table or equipment cabinet and a fiber optic is used to bring the light source from one projection lamp to a position behind the hologram. Using this system, 3 axes for measurement are provided and it is possible to determine the relative location of any point in the virtual image with respect to a given point, and to record same, making possible an accurate three-dimensional reproduction of the object shown in the virtual image viewed through the hologram.

One of the limitations of this method of measurement is that it is apparently limited to near objects because of the very rigid requirements that are inherent in holography, namely that the object being studied must be absolutely stationary with respect to the light source and also that the light source required is a laser (a coherent light source) which cannot be used at a distance because of the intensity of the beam that would be required.

Hence another object of this invention is to provide a means by which a far object can also be recorded by hologram and then used for study by means of the measurement technique described above for use with a near object.

This object is attained by use of stereophotos, initially, which are made into a stereomodel by the proper alighment technique described more fully hereinafter, and the stereomodel thus produced is recorded in the form of a hologram which is then preserved for mensuration just as if same had been made from a near object as previously described.

THE DRAWINGS

FIG. 4a is a schematic representation of stereoptic photographic viewing.

FIG. 4b is a schematic representation of hologram viewing.

FIG. 13 is a contour map of a toothless dental casting.

FIG. 14 is a profile section across the toothless dental casting of FIG. 13.

FIG. 15 is a table of measured elevations of the toothless dental casting shown in FIGS. 13 and 14.

FIGS. 16 and 17 comprise dental casting profiles.

FIG. 18 is a comparative contour map of the tooth of FIG. 15 done monocularly.

Figure 19:
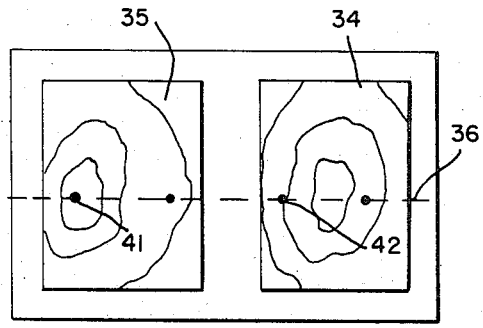

FIG. 19 is a schematic view showing a stereopair of photographs with an aligned baseline.

FIG. 20 is a schematic view showing the left photo covered and the right photo positioned for exposure to the holographic plate.

FIG. 21 is a schematic view of the apparatus for providing a reference beam for recordation of the right photo.

Figure 22:
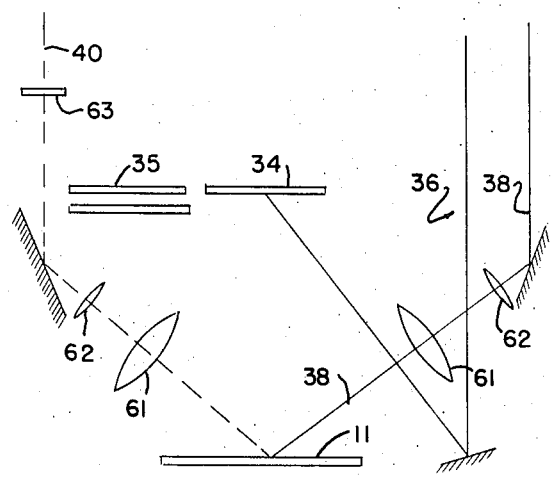

FIG. 22 is a schematic view of apparatus recording the right photo, with the left reference beam blocked.

FIG. 23 is a schematic view showing relatively oriented vertical diapositive photographic transparencies in position for projecting the right diapositive transparency onto the rear projection screen by coherent imaging.

Figure 24:
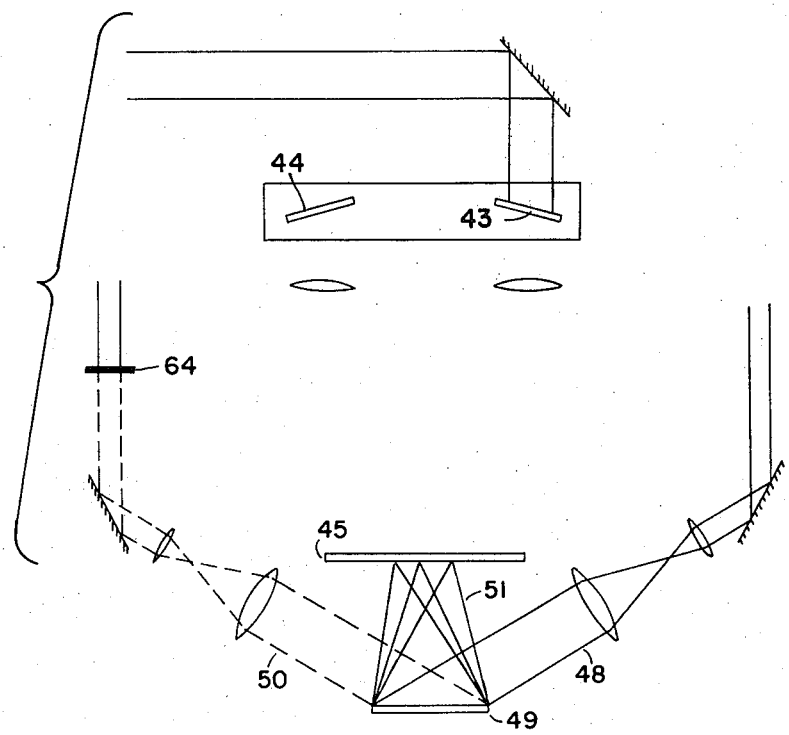

FIG. 24 is a schematic view showing projection of the right diapositive transparency and the right reference beam with the left reference beam blocked.

Figure 25:
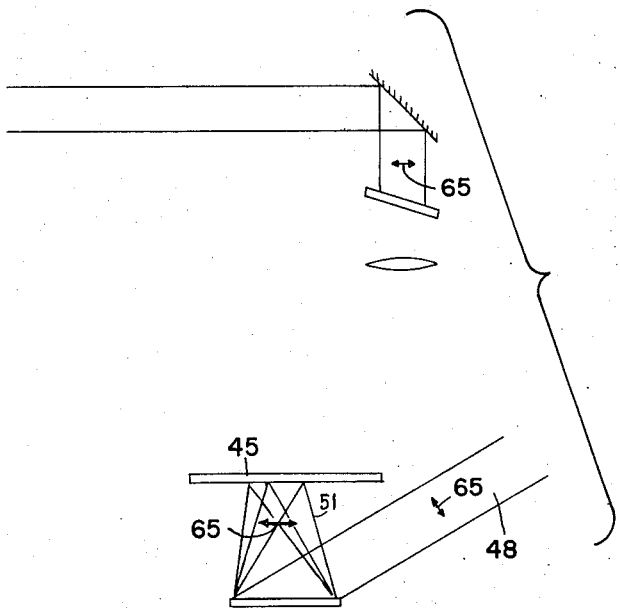

FIG. 25 is a schematic view showing the right diapositive transparency projected onto the screen with the reference and object beams both being horizontally polarized.

Figure 26:
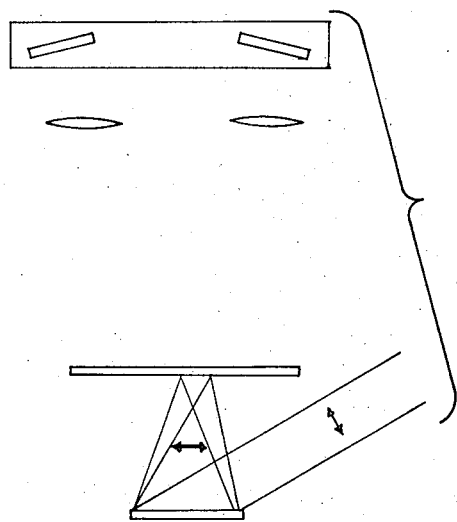

FIG. 26 is a schematic view showing the right reference beam horizontally polarized during recordation of the right diapositive transparency projection.

Figure 27:
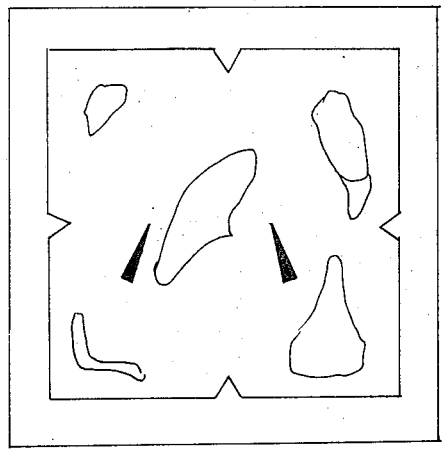

FIG. 27 is a schematic view of the rear projection screen as seen at the holographic plate during exposure of the right diapositive transparency.

Figure 28:
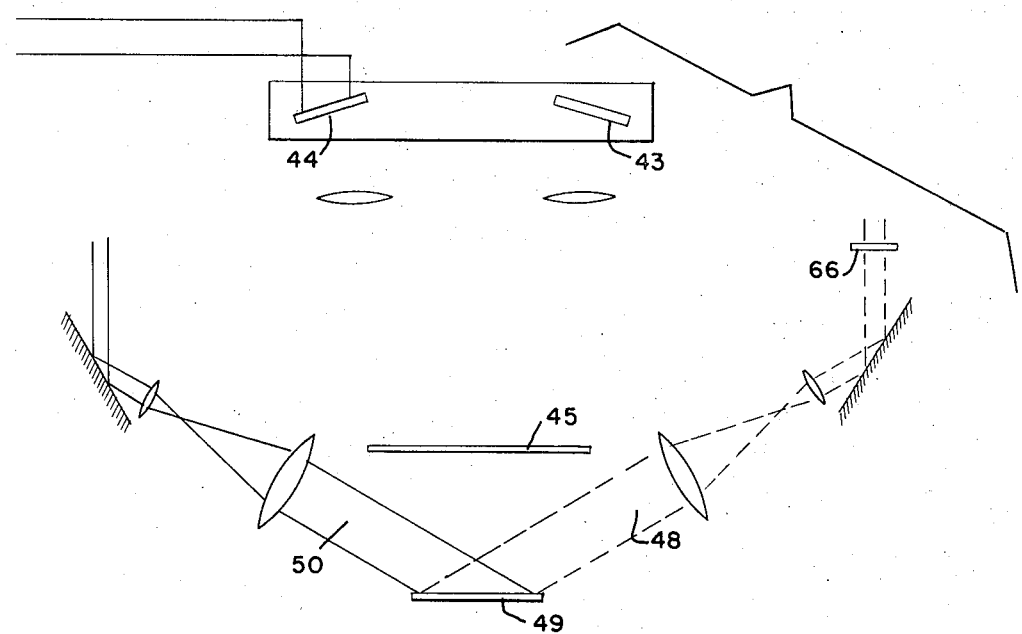

FIG. 28 is a schematic view showing projection of the left diapositive transparency and the left reference beam while the right reference beam is blocked.

Figure 29:
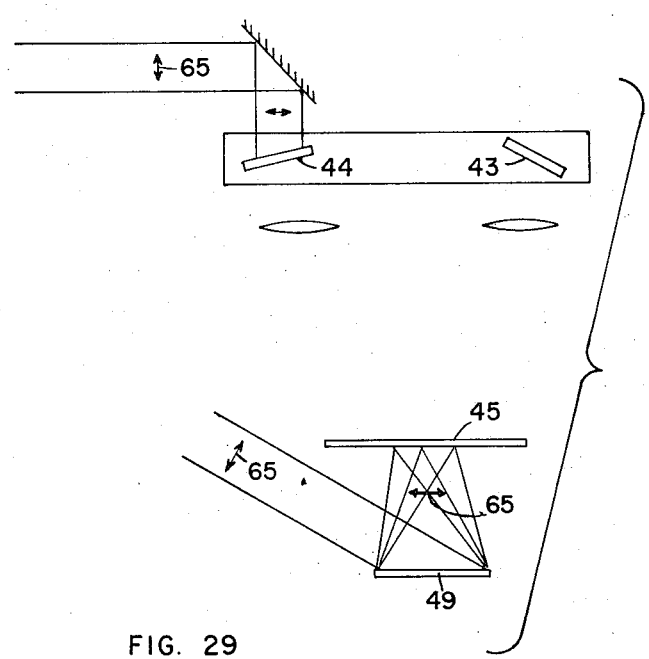

FIG. 29 is a schematic view showing projection of the left diapositive transparency onto the screen with both the reference and object beams being horizontally polarized.

Figure 30:
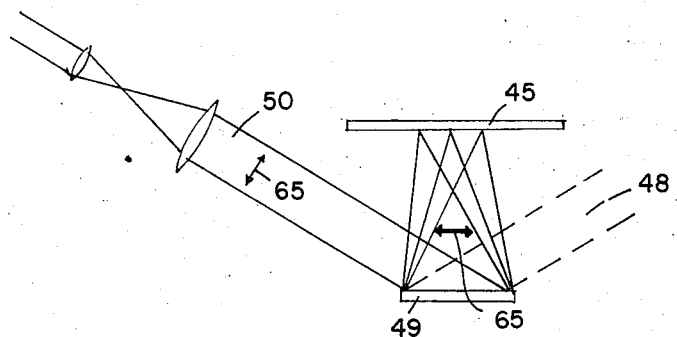
Figure 31:
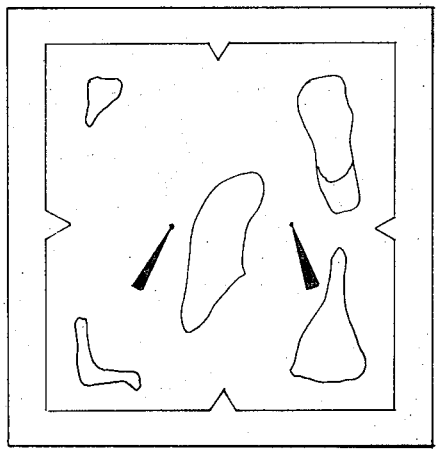

FIG. 30 is a schematic view showing the left reference beam horizontally polarized during recordation of the left diapositive transparency; and FIG. 31 depicts the appearance of the rear projector screen as seen at the hologram during recordation of the left diapositive transparency.

Figure 32:
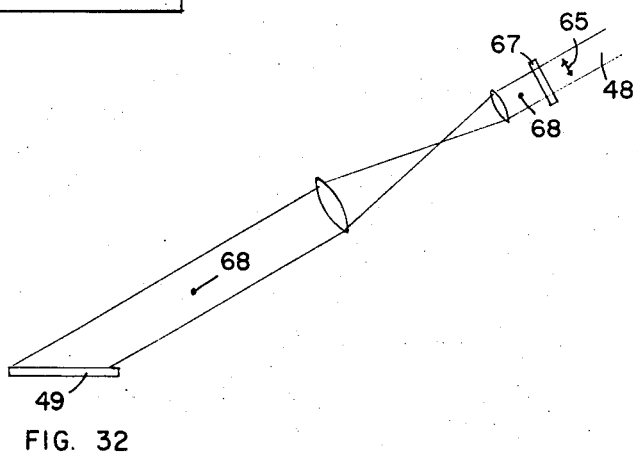

FIG. 32 depicts polarization of the right reconstruction beam rotated 90° by a half-wave plate.

Figure 33:
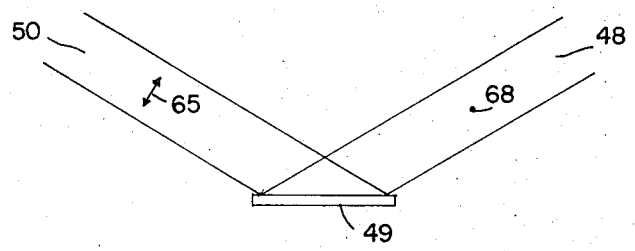

FIG. 33 is a developed holographic stereomodel in position for viewing.

Figure 34:
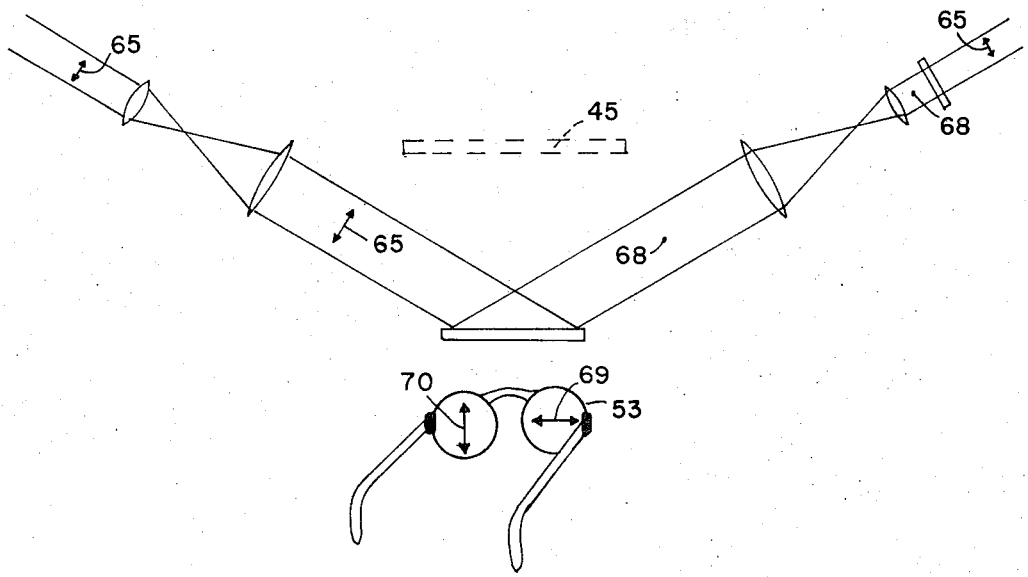

FIG. 34 is a representation of a view of a holographic stereomodel using a pair of polarizing filters.

DETAILED DESCRIPTION OF THE INVENTION

This invention is the subject of a final technical report for the U.S. Army Engineer Topographic Laboratories, prepared by the inventors through the Purdue University Research Foundation, entitled "Study of Potential Application of Holographic Techniques to Mapping." This report is dated October 1971 and is listed as ETL-CR-71-17. It is It to the public from the Defense Documentation Center (DDC) as No. AD734327.

I.

Holograms for Mensuration of Close-Range Objects

Recording and viewing a hologram.

Figures 1, 2:
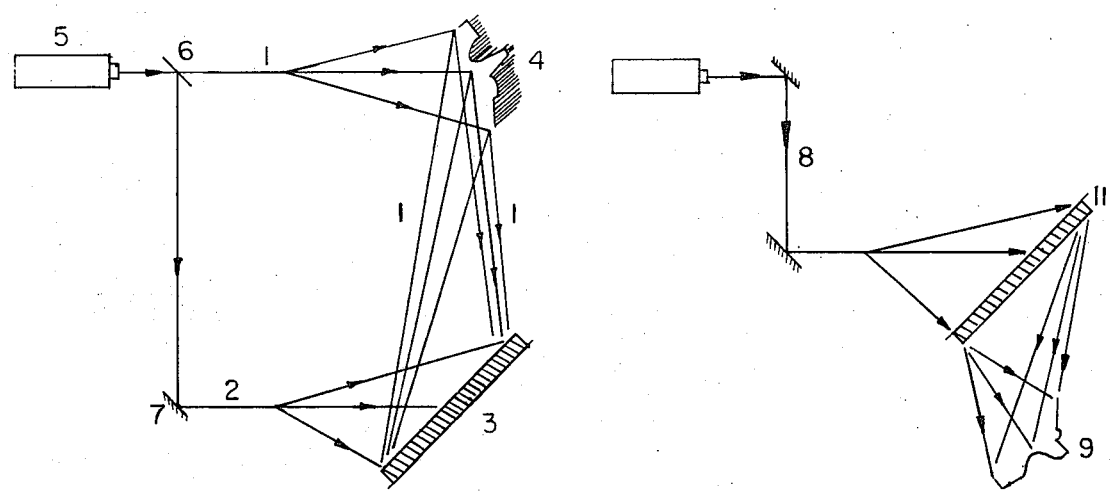
FIG. 1 is a schematic view of apparatus for making a hologram.
FIG. 2 is a schematic view of apparatus for viewing the real image of a hologram.

A hologram is a record, on photographic emulsion, of information about both the amplitude and the phase of the light associated with an object. Unlike a normal photograph which records the focused light intensity from the object, a hologram as depicted in FIG. 1 is produced by the intersection at a photographic plate 3 of the unfocused light 1 from the object 4 with the light 2 from a second reference beam. FIG. 1 depicts schematically the process of recording a hologram from two such beams which must be coherent and monochromatic. These characteristics and light beams are readily obtained with a laser source 5 passed through a beam splitter 6, with reference beam 2 being reflected by mirror 7 to the photographic plate 3. The light reflected off the object and the reference beam light form an interference pattern which is recorded on the photographic plate 3 to form the hologram. It is important to note that the fringelike interference pattern recorded on the plate is completely unintelligible. It is not a point-to-point representation of the object as is the image formed by the lens.

In order to view the holographic image, one must illuminate the developed plate with coherent light as shown in FIG. 2. As the reference light 8 travels through the hologram it is diffracted by the interference pattern on the plate 11 to produce the real image 9. This is analogous to the refraction of light by a lens to form an image. Depending on the type of hologram, the image can be seen either by light transmitted through the plate, as described above, or by reflected light energy. In most cases, the image 9 is not on the plate, but can be either in front of it or behind it. There are normally two images associated with a hologram and the observer can select either one of them for viewing.

FIG. 2 shows how a real image 9 can be seen between the observer 10 and the plate 11. This image will not be in the same position as the original object, as may be ascertained by comprising FIGS. 1 and 2. Furthermore, the holographic real image 9 exhibits pseudoscopic inversion with respect to the object. This, as well as the difficulty encountered in focusing the observer's eyes on empty space in front of the holograms, makes it less desirable for direct mensuration.

Figures 3, 6:
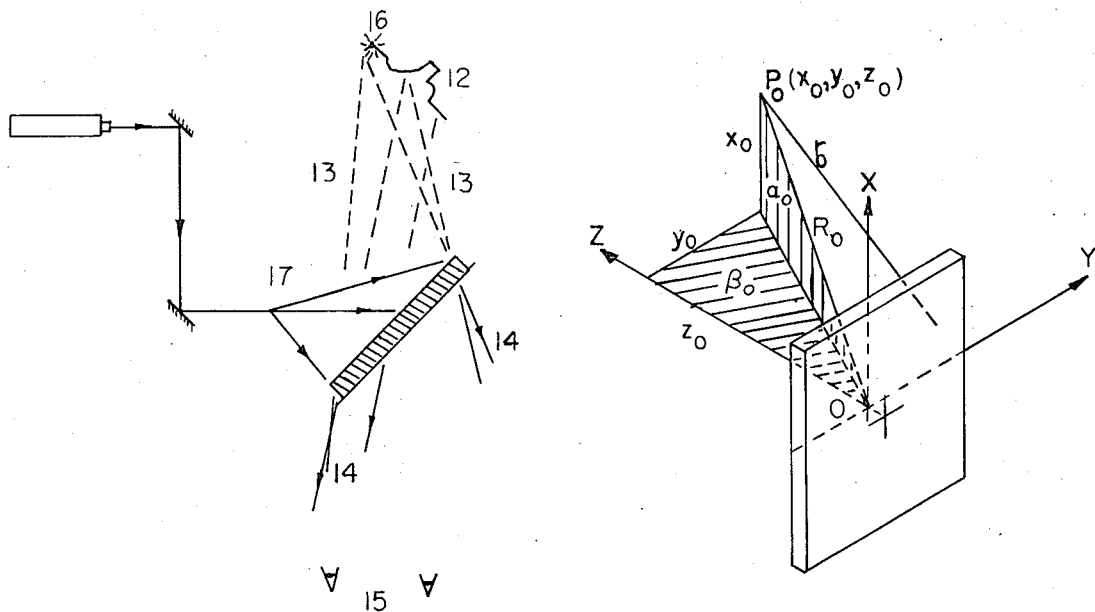
FIG. 3 is a schematic view of apparatus for viewing the virtual image of a hologram.
FIG. 6 is a representation of the holographic coordinate system.

The virtual image 12, as shown in FIG. 3, is preferred for mensuration purposes. It is considerably easier to view as it occupies the same position with respect to the hologram as the original object and bears the same geometric relationship to it. Unlike the real image case, where diffracted light rays 13 converge on the image, the diffracted rays 14 diverge and when reaching the eye of the observer 15 they appear to originate from the position of the virtual image. Consequently, one looks through the holographic plate as if it were a window, and sees an image which appears to be the object still where it was during recording. The image will be truely three-dimensional if the object originally was. Moreover, no restriction is placed on the way it is viewed, either by one eye or by two. There is a complete one-to-one correspondence between the image and the object. Accurate mensuration of this virtual image is possible and is more fully described hereinafter.

The hologram and the photogrammetric stereomodel

The difference between the image from a hologram and a photogrammetric stereomodel can best be illustrated by the window analogy. A hologram represents the case when the observer moves about behind the window and sees anything on the outside within the limits of the window size. By contrast a photogrammetric stereomodel depicts the situation when the observer is still looking out through the window but his head is fixed permanently in one place. This is because a stereomodel is a perspective view of the object taken with the apparent observer being fixed at one point in space.

Therefore, in terms of information gathered, it is more complete in the case of a holographic image than in the stereomodel.

Photogrammetric stereomodels can be measured in three dimensions mainly because of the existence of parallax between conjugate images in overlapping photographs, as shown in FIG. 4a. Consequently, the photogrammetrist's eye-base must be constrained parallel to the direction of the parallax for proper three-dimensional perception. By contrast, a holographic image is a complete replica of the original object and parallax exists in essentially all directions.

In viewing a hologram, therefore, the viewer can move about within certain limits, FIG. 4b. If from one viewing point part of an object is obscured by another, it can often be seen by simply changing the viewing point. The ability to change the viewing point is however constrained by the physical size of the hologram. The possibility of seeing obscured objects is totally missing in photogrammetric stereomodels. If one conjugate image of an object point is missing from a stereo-pair, it is impossible to determine the position of the object point from that stereo-pair. The shadowed areas which are lost in photogrammetry can often be seen in a hologram of the same object.

Similar to the photogrammetric model, the virtual image formed by the hologram can be measured with a self-illuminated mark 16 physically inserted into the space apparently occupied by the image. FIG. 3 shows that this is possible without obstructing the reconstruction light beam 17. This is not readily feasible with a real image because the diffracted light from the plate would be intercepted by the apparatus carrying the measuring mark.

As in any type of photographic recording, random relative motion of the object and the recording medium must be sufficiently small during exposure to avoid blurring. This requirement is considerably more severe in the case of holography because in this case very fine interference fringes are to be recorded. Therefore, if a random motion of more than ¼ of the wavelength of light occurs between the components of a hologram production set-up, no hologram may be produced. To accomplish this extreme stability the recording components are normally assembled on large vibration-free tables. Coupled with this requirement, relatively long exposures are used depending on the size of laser and type of emulsion used. However, when it is impractical to have stability and long exposures, a highpower pulsed laser and extremely short exposures can be used. Portrait holograms of living subjects have been recorded in this manner. Holograms have even captured a bullet in flight.

Of the many facets of holography, photogrammetrists have investigated formation of stereograms, creation of contours by interferometry, creation of profiles by optical correlation, and mensuration of the three-dimensional image. From work in the last area at Purdue, it appears that holography is quite useful in the mensuration and documentation of close-range objects. It is appropriate to compare holography with the existing methods which apply stereo-photogrammetry.

In photogrammetry, regular photography is used to record information from the ultraviolet end of the spectrum through the visible and up to the near infrared. Any source of light can be used whether coherent or incoherent, monochromatic or not. This is not the case with holography as coherent light must be used during recording to illuminate both the object and the photographic plate.

For close-range photogrammetric applications, there are essentially no real limitations on the size of the objects to be recorded. It is necessary, however, to properly design the location and separation between camera stations relative to the object. This design should take into account important factors such as the focal range of the lens, the base/distance ratio and the problem of complete coverage of the area of interest. The latter factor may require the taking of several stereo-pairs to avoid blind spots particularly for relatively complex objects. In holography, on the other hand, object size has been limited to that manageable in an optics laboratory but there are already indications that this restriction is progressively being overcome. As for coverage and blind spots, the hologram is considerably more efficient in storing complete information. In fact one hologram may be capable of recording the information equivalent to that stored in several stereomodels. For considerably convoluted objects, multiple laser beams can be used to illuminate the object and the recording may still be made on only one plate.

Regular photography with cameras presents an important depth of field problem, particularly when working with objects which are close to the camera lens. As a matter of fact the closer the object to the camera the smaller is the depth of field. In holography, however, depth of field is not a relevant criterion. Instead, the factor is the maximum dimension of the object in a direction normal to the holographic plate. This variable is dependent on the laser used in making the hologram and can be chosen to suit the mensuration task desired.

Close-range photography requires by necessity a variable-focus camera. Such cameras need careful calibration if the data obtained from them are to be of maximum use. Calibration is an important task of close-range photogrammetry which requires careful attention. By contrast, holography, which is often called "lensless photography", does not entail the same type of calibration problem, but care must be exercised in illuminating a hologram for viewing if quality geometric fidelity is to be attined.

Once the information is recorded, either on overlapping photographs or with a hologram, a "play back" phase is necessary for three-dimensional mensuration. In the case of photogrammetry this operation is performed either analogically on relatively elaborate equipment, analytically using sophisticated mathematical models. In order to subjectively perceive in three dimensions binocular stereoscopic vision is necessary. In the case of holography the orientation of the visible three-dimensional image is reasonably simple because the degrees of freedom are fewer than the photogrammetric counterpart. Furthermore, viewing a holographic image either for qualitative interest or for mensuration does not require vision in both eyes. It must be noted that the precision of pointing in the image space may depend on the depth perception, but this will also be true when mensuration is performed on the object directly instead of its holographic image. Finally, a hologram plate is not suitable for analytical reduction, at least not in the same sense as in computational photogrammetry because there is nothing to measure on the plate itself.

Photogrammetric techniques have been thoroughly developed and the methodology of extracting reliable information from stereomodels is well established. Furthermore, close-range applications are quite versatile indeed, ranging from mensuration of the eye's retina to documenting architectural and archaeological findings. Holography for these types of activities is still in its infancy and proper techniques for the different applications need to be established.

Evaluation of the hologram for mensuration

Unlike a photograph or a stereomodel, which produces only one image, a hologram produces two images of the object as explained earlier. For the purpose of mensuration we considered both images. As was mentioned before, the virtual image was considered as more suitable for the purpose than the real image. Consequently all of our quantitative analyses were performed on the virtual image formed by the hologram.

In order to extract metric information from the holographic image one must have some type of a reference mark to move about in the space of the image to be measured. Three types of measuring marks are possible: a reflected light mark, a holographically produced mark and a self-illuminated mark.

Redman has suggested making an additional hologram of a dot and then viewing the two holographic images of the object and of the dot at the same time. To do this the two holograms would have to be illuminated for viewing by the same beam. When this is done the hologram of the dot distorts the reference beam before it gets to the second hologram. The then distorted reference beam causes the resulting image of the object hologram to be distorted. Since additional sources of distortion are obviously undesirable the idea of a holographic dot is not practicable.

A self-illuminated dot is used since there is no light in the virtual image and the self-illuminated dot does not disturb the image but appears to float within it. This type of measuring mark was found to be well suited for the mensuration of holograms and was used throughout the project.

Figure 5:
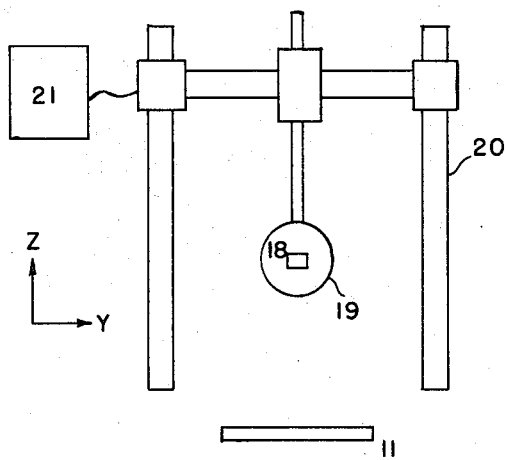
FIG. 5 is a schematic view of apparatus used in measuring the object depicted by a hologram.

The first mensuration system as shown in FIG. 5 used consisted of a Kelsh tracing table 19 attached to a rack-and-pinion coordinatograph 20, both of which were well known in the art. The two readings from the coordinatograph (Y and Z), were automatically recorded on a card punch 21, while the third coordinate (X), was read of the platen's counter and manually punched. For convenience in viewing, the holographic plate is normally mounted vertically and the observer views it looking horizontally through it. This makes it impossible to see the dot on the horizontal platen, unless it is made to appear in a vertical plane. This was done by placing a 90° prism 18 on top of the tracing table, as shown in FIG. 5. It is effective to paint the platen black so that no stray light is reflected off its surface to interfere with the viewing process.

After some experimentation with this first system it was found that the floating mark did not remain stationary when the observer moved his head to be sure of his pointing. This led to constraining the light from the prism to a horizontal narrow slit-like area. With this modification some more readings were taken and reduced, but more system improvements were desired. This is because the precision in the x-direction (FIG. 6) was noticeably higher because of the constraint just mentioned.

Figure 7:
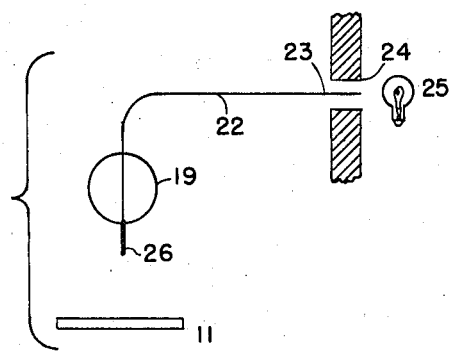
FIG. 7 is another schematic view of the viewing equipment.

To avoid such directional bias we did away with the prism altogether as shown in FIG. 7. Instead a piece of fiber optic 22 was used which is 0.001 inch (0.025 mm) in diameter with one end 23 set into the hole 24 in the tracing table for illumination with a bulb 25. The other end 26 was firmly attached horizontally on the table thus forming the luminous dot used in the measurement. This arrangement worked out much more satisfactorily than the prism, however the prism system does work.

Figure 8:
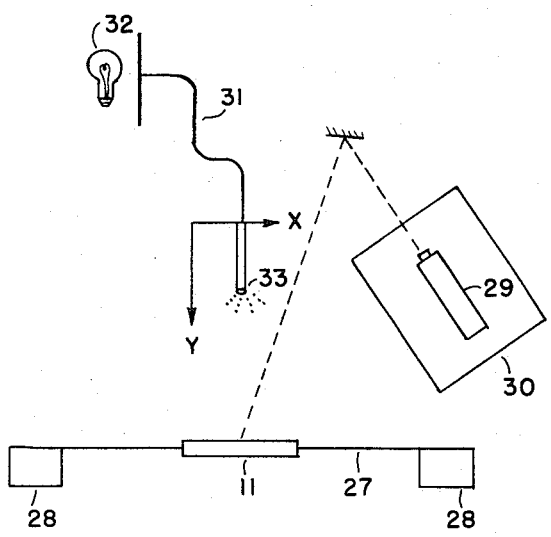
FIG. 8 is a view of a system incorporating provision for simultaneous viewing of the X, Y, Z axes.

The combination of a tracing table and a coordinatograph, while having succeeded in producing hologram mensuration results, had one drawback. The x-coordinate was read off the table's counter and recorded manually, while Y and Z were automatically recorded. To alleviate this undesirable feature a system of three mutually orthogonal axes whose readings can be recorded automatically was employed. A Wild A7 with an EK5 digitizer was employed for the desired embodiment. This is schematically shown in FIG. 8. A bracket 27 is built between the gear boxes 28, 28 to hold the hologram. We placed the laser 29 on the plotting table 30, and used a long fiber optic 31 to bring light from one projector lamp 32 to a position 33 behind the hologram 11. A few sets of measurements with this preferred embodiment proved that this system is accurate. One of its advantages is that the least reading on all three axes is 0.007 mm. (The least count in the A7 is designated as 0.01 "A7 mm", but physically this is actually 0.007 mm.).

The precision of pointing to target points in the holographic virtual image was tested with the preferred embodiments and its predecessors. For this task some 1,000 pointings were performed under varying combinations. Table 1 shows the results for five different cases which follow the chronological order of the development of mensuration systems discussed above.

TABLE 1. Pointing Precision

| Observer | No. of Pointings | Standard Deviation in Inches | | |
|---|---|---|---|---|
| | | X | Y | Z |
| I. 3/28/70 | Tracing Table with prism on drafting table | | | |
| MKK | 20 | 0.002 | 0.056 | 0.021 |
| MKK | 20 | 0.004 | 0.056 | 0.018 |
| GHG | 20 | 0.002 | 0.030 | 0.015 |
| GHG | 20 | 0.003 | 0.031 | 0.025 |
| II. 5/01/70 | Tracing table with fiber optic on drafting table | | | |
| MKK | 10 | 0.002 | 0.007 | 0.012 |
| GHG | 10 | 0.003 | 0.007 | 0.035 |
| III. 5/18/70 | Tracing table with fiber optic on Kelsh Slate | | | |
| GHG | 20 | 0.002 | 0.003 | 0.014 |
| GHG | 20 | 0.002 | 0.007 | 0.022 |
| IV. 6/26/70 | Autograph A7 system | | | |
| GHG | 10 | 0.0026 | 0.0018 | 0.0142 |
| GHG | 10 | 0.0013 | 0.0027 | 0.0129 |
| V. 8/4,5/70 | Autograph A7 system | | | |
| GHG | 20 | 0.0022 | 0.0027 | 0.0107 |
| GHG | 20 | 0.0034 | 0.0033 | 0.0128 |
| GHG | 20 | 0.0029 | 0.0029 | 0.0141 |

Our next concern was with the geometric fidelity of the holographic image. Two laboratory test objects were made to serve as targets and several holograms of each were exposed. The first target board, which contained nine points, was measured twice by three observers under similar conditions. The raw data was then subjected to a 7-parameter transformation to match the original test targets, and the residuals from the transformation were computed. Table 2 summarizes the standard deviations computed from these residuals.

TABLE 2. Standard Deviations from Transformation Residuals

| Observer (Scale) | Standard Deviation in Inches | | |
|---|---|---|---|
| | X | Y | Z |
| GHG Scale=0.99988 | 0.012 | 0.028 | 0.028 |
| MKK Scale=0.99926 | 0.024 | 0.033 | 0.027 |
| RJH Scale=0.99652 | 0.026 | 0.045 | 0.030 |
| GHG Scale=1.00110 | 0.009 | 0.025 | 0.028 |
| MKK Scale=1.00670 | 0.013 | 0.021 | 0.031 |
| RJH Scale=0.000442 | 0.008 | 0.022 | 0.028 |

The second test board with 20 targets was used to make several holograms with $\alpha_r = 0$ but at different recording angles $\beta_r$ (See FIG. 6). Each hologram was viewed under two or three different reconstruction angles $\beta_c$ and five pointings were made on each of the 20 targets. The pooled estimate of the standard deviation was computed from $$S_{P_X}^2 = \frac{\sum_{j=1}^{20} \sum_{i=1}^{5} (X_{ij} - \bar{X}_j)^2}{\sum_{j=1}^{20} (n_j - 1)}$$

where $x_j$ is the mean of the 5 readings on point $j$ and $x_{ij}$ represents each of the 5 readings on point $j$. This can be reduced to $$S_{P_X}^2 = \frac{\sum_{j=1}^{20} \sum_{i=1}^{5} (X_{ij} - \bar{X}_j)^2}{80}$$

The mean of the five readings for each target ($x_j$, $y_j$, $z_j$) was then used in a 7-parameter transformation to fit them to be known target values, and the standard deviations of the residuals were computed. The results from both of these computations are given in Table 3.

TABLE 3. Accuracy and Precision Measures for Image Fit to Object

| $\beta_r$ | $\beta_c$ | | Standard Deviation in Inches | | |
|---|---|---|---|---|---|
| | | | X | Y | Z |
| Tracing table with fiber optic 4/14/4/70/5/18/70 | | | | | |
| 50° | 50° (Perfect) | Pooled estimate | 0.009 | 0.017 | 0.017 |
| | | Estimate from residuals Scale=1.00899 | 0.010 | 0.008 | 0.016 |
| | 52° | Pooled estimate | 0.003 | 0.005 | 0.013 |
| | | Estimate from residuals Scale=1.00729 | 0.011 | 0.005 | 0.016 |
| | 54° (Brightest) | Pooled estimate | 0.003 | 0.006 | 0.18 |
| | | Estimate from residuals Scale=1.00453 | 0.014 | 0.005 | 0.017 |
| Tracing table with fiber optic 1/22/4/70/5/19/70 | | | | | |
| 45° | 45° (Perfect) | Pooled estimate | 0.004 | 0.017 | 0.027 |
| | | Estimate from residuals Scale=1.0096 | 0.009 | 0.009 | 0.018 |
| | 49° | Pooled estimate | 0.003 | 0.009 | 0.019 |
| | | Estimate from residuals Scale=1.0130 | 0.011 | 0.013 | 0.017 |
| Autograph A7 system 4/14/4/70/7/15/70 | | | | | |
| 50° | 50° | Pooled estimate | 0.0056 | 0.0051 | 0.0261 |
| | | Estimate from residuals Scale=1.01147 | 0.0063 | 0.0048 | 0.0192 |

Figure 9:
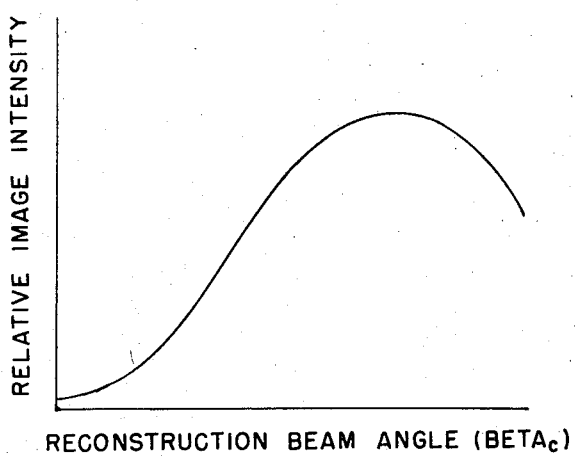
FIG. 9 is a graph of image intensity vs. beam angle.

A third aspect which we studied was evaluating the effect of rotating the illuminating beam from its theoretical correct position, on the geometry of the holographic image. Such a rotation was found to be necessary in order to obtain the brightest image which may be important for distinct viewing. Shrinkage in the emulsion thickness causes a change from the angle used for recording. We were concerned about this shift as it affects the geometric fidelity of the image. If it were sufficiently small, then the error produced could be assumed linear and the geometric fidelity of the image would be preserved. By mounting a plate holder on the modified 1-minute transit we were able to measure this shift. With Kodak 649F plates, the object normal to the plate, and the reference beam 50° from the normal, we observed a shift of 4°. This was the largest amount of shift we obtained in a number of different tests. FIG. 9 shows the change in holographic image intensity as the reconstruction beam angle changes.

Figure 10:
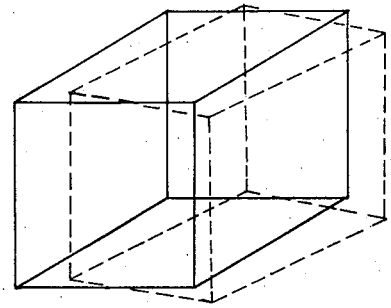
FIGS. 10, 11 and 12 are schematic views of an image relative to an object viewed, with different angle shifts.
Figure 12:
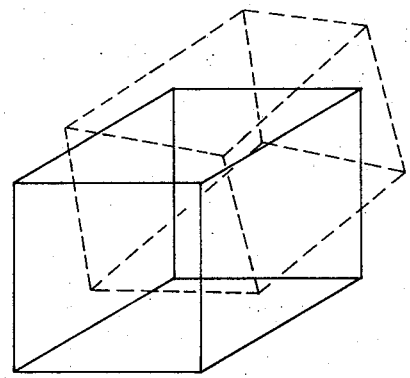
Figure 11:
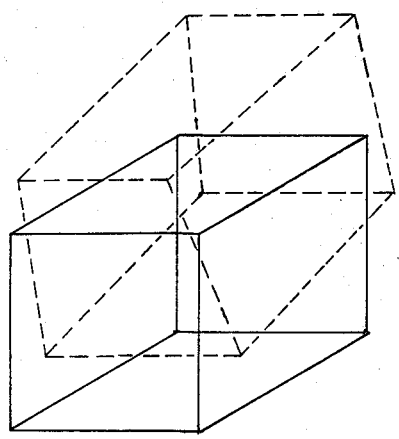

In order to appreciate the effect of this shift on the image geometry, we ran a specially designed simulation program for the holographic image of a 4 inches cube. Three representative cases are given in FIGS. 10, 11, and 12, which show exaggerated schematics of the image relative to the object, as produced by Cal-Comp plots. FIG. 10 depicts the case of a differential error of +3° in $\beta_c$ only, FIG. 11 of +3° in $\alpha_c$ only, and FIG. 12 of +3° in both $\alpha_c$ and $\beta_c$. In all cases the recording angles are $\alpha_r = 0°$ and $\beta_r = 50°$.

From these simulations it became obvious that the holographic image will considerably shift from the position of the original object as the reconstruction beam shift increases. However, this absolute displacement is not important particularly if the geometric properties of the object are preserved in the image. This was found to be so for reconstruction beam shifts up to 5°. A 7-parameter transformation was quite adequate in fitting the image to the object.

It has been shown above that holography offers a number of advantages and may be used as a supplement to photogrammetry for close-range work. Pointing on the virtual image of a hologram was shown to be entirely feasible. Precisions for this task of ± 0.003 inches in X and Y, and ± 0.012 inches in Z were attained from direct viewing by the unaided eyes, using relatively simple mensuration systems. Finally a study concerning reconstruction geometry and image distortions indicated no serious problems regarding mensuration of holograms.

One example of the practical use of this invention was obtained by measurement of a tooth for preparation of a casting of same. After consultation with a dentist, several dental castings were obtained to make holograms which recorded bite, occlusions, cavities, extractions, the overall appearance of the teeth from the outside as well as from the inside and the general topography of the gums. It is believed that accurate measurements of castings may be done quickly with holography. It is even possible to visualize holograms of a person's open mouth using a pulsed laser. Such a procedure would eliminate the need for castings for certain work. For the present if measurements were performed on castings made at different times, then long term deformations could be studied. It was indicated that contours, profiles and selected "heights" were needed to an accuracy comparable to the results we had obtained on other objects. A toothless dental casting was selected as a suitable object to demonstrate applied holographic contouring, profiling and pointing to depict the topography of the gum. The topography could be useful in the fabrication of a denture.

FIGS. 13, 14, and 15 present the results obtained on the A7 using a dual plate hologram of the toothless dental casting. Selected points of interest were premarked on the casting which was then toned down with black spray paint in order to be able to follow the surface with the measuring mark. After plotting topographic contours, the elevations of selected points were determined from the counters on the A7 and recorded in FIG. 15. If another casting, made at a later time, were also measured at the same points, then one could quantitatively determine gum deformation with time.

The contouring of this object was especially interesting because it is a highly convoluted object. Note that the 6 and 8 mm contours of FIG. 13 pass beneath the others. The profile section A—A, FIG. 15, shows why this occurs since on the left side the higher position extends over the lower part.

Profiling was the most difficult task. When needed as a check, the profile was retraced starting from the opposite side. The dashed line represents the profile from the return plot. Profiles were recorded at one centimeter intervals using the image of the scale fixed on the object as a guide. FIG. 16 shows profiles 2, 3 and 8. FIG. 17 shows profiles 4, 5, 6 and 7, two of which were drawn by a different observer. The two observers experienced more difficulty following the steeper slopes. This experiment was performed in the virtual image space from a single holographic exposure of an object positioned only 8 or 9 inches from the plate emulsion. The 5 × 8 inch hologram offered the variety of perspective views needed for plotting overhanding and hidden surfaces. A lens was used only to aid in identification of and pointing at the control points. The entire casting was visible as a sharply focused 3-dimensional virtual image.

As a final test another observer (NB), who possesses only one eye, attempted to point and contour the same image. FIG. 18 shows effective plotting except in those regions of extremely steep slope. The observer noted that there was never any question as to the shape of the object which he could discern from the image by moving his head about. He could not have used a stereomodel at all because that would require a subjective mental impression formed while simultaneously viewing two separate perspective photographs or projections. This test demonstrated the pictorial value of a true 3-dimensional image.

II.

THE HOLOGRAPHIC STEREOMODEL

The holographic stereomodel can be constructed from either photographic prints of normal or vertical photography or from diapositive transparencies of vertical or tilted photographs. Both methods, described below, use the same procedure for viewing in three dimensions.

Recording from Prints

In this procedure two photographs are separately used as diffuse objects for direct double-exposure holographic recording. Both photographs 34 and 35 are caused to occupy the same object space prior to recording so that two overlapping virtual images are seen when the hologram is illuminated for viewing. Both photographs are first approximately oriented in a mirror or lens stereoscope and then fixed in relative position on a mounting board. The principle points are identified. The distance between the left principle point and its conjugate image in the right photograph is measured. The "flight line" 36 (also called the "base line") connecting both principle points and their conjugate images is made parallel to the surface of the table on which the recording is performed, as shown in FIG. 19.

Simple lateral translation is used to position the photographs for recording.

One photograph 34 is positioned in front of the hologram 11 and the other photo 35 is covered by cover 60, see FIG. 20. The photograph 34 is illuminated with the object beam 36 which is reflected off a large mirror 37 and the hologram plate 11 is illuminated with a reference beam 38 intersecting the emulsion side 39 at an angle from one side. See FIG. 21 for the lens arrangement 61, 62 of the reference beam 38. The other reference beam 40, symmetrical to the first reference beam 38 but entering from the other side, is blocked by plate 63, see FIG. 22. The plate 11 is exposed and then covered. The second photograph 35 is translated into position by moving it laterally by the distance between the left principle point 41 and its conjugate image 42 on the right photo 34, see FIG. 19. The first photo is covered and the reference beam switched to the other side. The second photo is illuminated with an object beam from a mirror. The hologram plate is then uncovered and given a second exposure to the diffuse light reflected from the second photograph. After this double exposure the plate is developed under visual observation until it is of the proper density. After development the hologram can be re-illuminated simultaneously with both reference beams for viewing. The observer will see two overlapping virtual planar images of the photographs. A slight tilting of the plate 11 removes any residual parallax due to inherent differences in the photographic prints. The stereomodel is perceived in the vicinity of the plane of the photographs during recording. The photographs are no longer needed since the hologram has recorded a stereomodel which is subject to mensuration just as described under Part I above in respect of a hologram of a near object.

It will be appreciated that residual parallax in the prints photographed may be removed by a minor adjustment of the plate in the holder. This shifts the two images in opposite directions because the oppositely entering reconstruction beams are effectively shifted in this manner.

Recording from Projections

For this procedure, preferred over the first because of its versatility and increased accuracy and resolution, two diapositives 43 and 44 are relatively oriented while projecting them onto a translucent rear projection Screen 45 (Polacoat) which later serves as the diffuse holographic object during recording. The relative orientation is performed as with a twin projection plotter, but is facilitated because coherent imaging is used. The screen can be translated back and forth to take out x-parallax without defocusing. When the x parallax is zero at a point the projectors 46 and 47 are adjusted to remove the y parallax. Thus the relative orientation is performed in the space of the stereomodel formed by the projectors. The tranparencies are directly illuminated without a diffusing screen. The image appears sharp and "focused" as the screen is moved. For vertical photographs a single projector with a translator to alternately position the transparencies can be used as a substitute for twin projectors. The diapositives are individually adjusted until relative orientation is obtained in the model space. FIG. 23 shows the arrangement ready for projecting for holographic recording.

After relative orientation, one diaposition 43 is projected on the rear projection screen 45 which has been fixed in the model space. One reference beam 48 is directed to the hologram plate 49 behind the screen 45 at a comfortable viewing distance (9 inches). The other reference beam 50 is blocked with plate 64, see FIG. 24. Both object and reference beams 51, 48 are horizontally polarized as indicated by arrow 65, see FIG. 25. The object beam 51 experiences very little depolarization as it passes through the screen 45 which is caused to glow in a diffuse manner. The two beams interfere at the plate where they are recorded, see FIG. 26. FIG. 27 shows the object recorded by the hologram upon exposure.

The plate 49 is covered, the reference beam 50 is unblocked while reference beam 48 is blocked with plate 66, and the other diapositive 44 is projected to the screen 45, see FIGS. 28 and 29. The beams have the same polarization as before, as shown by arrow 65 in FIG. 30. FIG. 31 shows the hologram object for the second exposure. After these adjustments the plate 49 is uncovered, exposed, developed as before, and repositioned for viewing with both reference beams simultaneously. The observer sees two overlapping virtual images in the plane of the screen.

Viewing system

Orthogonal polarization is used to obtain separate views for each eye. The laser beam itself is polarized in a known direction used during recording. Accordingly, the reference beams, when used for reconstruction, are polarized in the same direction. The holographic images retain the polarization of the reconstruction beam. Thus if the polarization of one of the two reconstruction beams is rotated 90° by introducing a half-wave plate 67 as indicated by dot 68, which is an arrow running perpendicular to the page, the associated image will be similarly polarized, see FIG. 32. For stereo viewing this is done (See FIG. 33) and the observer is equipped with spectacles 53 with orthogonally oriented polarizing filters as indicated by arrows 69, 70. One of the two images is extinguished for each eye when both reconstruction beams are projected simultaneously, see FIG. 34.

Since each eye sees a different view of the entire screen, the observer perceives three-dimensions and sees the holographic stereomodel, the whole model, in the vicinity of the object recorded, in this case the screen 45. The overlapping virtual images replace the photographs or projections. Mensuration can be performed in the virtual image space if the object (screen 45) is removed and a self-illuminated measuring mark inserted in the empty space, as described above in respect of close-range three dimensional objects.

Other Features of the Holographic Stereomodel

Compared to earlier concepts, the holographic stereomodel recording process does not record information about the lens system used to view or project the photographs. When the holographic stereomodel is made from prints the lens system is not even present although it may have been used earlier to make the prints of the desired scale or to rectify them in some manner. When the holographic stereomodel is made using the rear projection screen, the screen itself is the object and not the projection system which is effectively obscured. After recording, the projection system is no longer needed.

Unlike the holographic stereoscope concept in which two photographs are separately recorded on separate holograms, the holographic stereomodel concept records overlapping photographs on one hologram such that the entire hologram will produce overlapping images when it is viewed. The relative orientation between the photographs is captured at the time of recording as well as the information on the photographs which are then no longer needed. In the holographic stereoscope concept the viewing system is built into the recording, thus limiting viewing to one person at a time. The external aid used to view the holographic stereomodel, polarized spectacles, can be worn by several observers who can then view the stereomodel as long as they can somehow see through the hologram window, or, even better, observe the real images projected onto a viewing screen, Experimental verification has shown that the overlapping real images retain sufficient polarization after passing through a Polacoat rear projection screen.

Since no lenses are recorded, the position of the eyes for interpretive viewing is not critical as it is in the case of the other concepts. Freedom to move the head about makes it possible to perceive increased resolution because the background speckle "noise" is averaged out. The holographic stereomodel recording is not so angle sensitive that the image brightness decreases as the head is moved.

For all of the concepts the position of the eyes is important for mensuration and mapping. As the head is moved the perspective changes because the plane images are no longer viewed normal to the plane or may not be viewed from the correct position to obtain an undistorted model. The situation is analagous to the requirements for obtaining the correct perspective when viewing through a lens stereoscope or through spectacles to perceive an anaglyphic or vectographic model. The eye base must lie in the plane containing the imaged principle points and their perspective centers. Once this position is obtained the relief may be exaggerated with the holographic stereomodel by simply changing the viewing distance, a well known advantage of the anaglyph and vectograph. This possibility is lacking in the other concepts because the distance is controlled by the holographically recorded lenses.

Since the holographic stereomodel recording produce two images no matter where seen over the hologram, a large plate is not needed. This means that on a given plate, by using only a portion of the emulsion for each stereomodel recorded, one can store a strip of stereomodels, or a block. Although the resolution will decrease, as the hologram size decreases, quite satisfactory stereomodels can be seen with a hologram 1 cm by 1 cm. A simple mirror or prism system can split the light and direct it to the eyes for viewing. From the data storage and retrieval aspect being able to store a stereomodel of a very large area on a relatively small glass plate is attractive.

From the photogrammetric mapping aspect it is desirable to use larger holograms to obtain maximum resolutions and brightness and to facilitate interpretation. In this case one might choose to store stereomodels by a multiple exposure technique using angular separation to reduce crosstalk between models. This technique, which exploits the storage possibilities in the thicker emulsions, is limited to just a few multiple exposures if high quality is obtained, but it suffices for storing a strip.

A unique feature of the holographic stereomodel is the possibility of simple a posteriori removal of residual y-parallax errors, a particularly valuable feature when the stereomodel is made from photographic prints. Because the viewing beams enter the plate from the right and the left side and the fact that two beams are used rather than one, it is possible to vertically shift the images relative to one another by a simple plate rotation about an axis normal to the center of the plate. One image moves up and the other down. More sophisticated adjustments can be made by adjusting only one of the beams. If the recording has been done using collimated reference beams the image distortions are minimized when the beams are adjusted or the plate rotated.

By the simple expedient of reversing polarization an inverted depth may be perceived in the holographic stereomodel. This aids in interpretation and is easily accomplished by turning the viewing spectacles upside down. This possibility is lacking in the other concepts.

By rotating the hologram 180° about a vertical axis the overlapping real images can be projected toward the observer. They can be viewed with the spectacles but it is more difficult to focus the eyes at the correct position in space. As mentioned above, however, a screen can be placed at the place where the real images focus and stereo perceived by looking at the overlapping images on the screen. With a true hologram of a three-dimensional object this would not be possible because the image would not be focused at one plane in space. However, when a stereopair is used to create the holographic stereomodel the holographic object recorded is a plane. Both photographs are recorded in the same plane. The projected real holographic image will then be a plane with overlapping imagery and it is easy to make the viewing screen coincide with the place of fous. Of course a virtual dot can be used on the real image for mensuration, same merely comprising a reversal of parts. This possibility is lacking in the other concepts.

In the holographic stereomodel both the real and the virtual images can be further magnified by introducing a lens. This aids in interpretation and pointing. The distortion due to the lens will cause the image and the measuring mark to appear equally distorted when they are in coincidence in a true holographic three dimensional image; thus it will have no effect on mapping except to increase accuracy. In the case of the holographic stereomodel the images and mark are not in actual coincidence when the observer perceives them to be and therefore there could be some added distortion. It is believed that by using a good binocular viewing device with lenses and polarizing filters that the advantages gained will offset the minor distortions. Regardless, the possibility of external lens magnification to obtain increased accuracy would be most difficult with the other concepts.

If the holographic stereomodel is produced using projection, the image projected on the screen can be enlarged so that the fine detail is larger than the speckle. Coherent imaging allows magnification by projection up to the limiting resolution of the diapositive. When this limit is projected onto the screen and recorded it is greater than the size of the speckel pattern. This minimizes potential loss of resolution due to speckle. For a very large screen the hologram may have to be positioned farther away to efficiently record the information. This is a consideration for the design of the mensuration system because the model will be perceived in the screen plane. Alternatively, a small portion of a greatly enlarged projection can be holographically recorded at close range for study of fine detail in the imagery. This possibility is most difficult to visualize in any of the other concepts except the impractical hologrammetric stereomodel concept in which the model can be scaled by changing the base.

We claim:

1. A method for quantiative mensuration of a holographc virtual image constructed from a three-dimensional object comprising the steps of:
   a. recording a hologram of the object to be measured;
   b. reproducing the virtual image of said hologram;
   c. interposing a self-illuminated mark provided with an adjustable three-dimensional motion capacity into the space of said virtual image;
   d. viewing said image and said mark;
   e. selectively aligning said self-illuminated mark with reference points located in said virtual image; and
   f. recording the three-dimensional coordinates of the location of said mark.

2. An apparatus for quantitative mensuration of a holographic virtual image constructed from a three-dimensional object comprised of the following:
   a. means for producing a holographic virtual image of a three-dimensional object;
   b. a self-illuminated mark adjustably located within the space occupied by said virtual image;
   c. means for imparting three-dimensional motion to said self-illuminated mark;
   d. means for viewing said mark and said virtual image; and
   e. means for recording the three-dimensional coordinates of the location of said mark.

3. A method for holographic stereomodel construction comprising the steps of:
   a. Using two photographic prints of normal or vertical photography which are adapted for stereoscopic viewing by conventional means;
   b. orienting both photographs in a mirror or lens stereoscope;
   c. fixing both photographs in relative position on a mounting board;
   d. identifying the same principal points in each photograph;
   e. measuring the distance between the principal point of one photograph and its conjugate image in the secon photograph;
   f. orienting the line of measurement of step e above so that it is made parallel to the surface of a table on which the recording is to be performed;
   g. positioning one photograph in front of a covered hologram plate while the second photograph is covered;
   h. illuminating the photograph that is positioned in front of the hologram plate with a coherent light object beam while the covered hologram plate is illuminated with a reference beam of coherent light, said reference beam being incident to said hologram plate;
   i. exposing said hologram plate to the interference of the light from said reference beam and said object beam's diffused light which is reflected from the photograph;
   j. recovering said hologram plate after the proper length of exposure time;
   k. translating the second photograph into the same position as the first occupied in front of said hologram plate by moving it laterally the exact distance measured in step e above as the distance between the principal point of this second photograph and its conjugate image in the first photograph;
   l. illuminating the second photograph with a coherent light object beam while said first photograph is covered and while said covered hologram plate is illuminated with a reference beam of coherent light, said reference beam being incident to said hologram plate at an angle direction from the opposite side as for said first photograph and in a symmetrical position;
   m. exposing the same area of said hologram plate as exposed before to the interference of said reference beam and said object beam's diffused light which is reflected from said second photograph;
   n. developing said hologram plate by conventional procedures;
   o. positioning said developed hologram plate in the same position as it was during the exposures but with said photographs removed;
   p. illuminating said developed hologram plate simultaneously with two identically polarized coherent reference beams that are respectively positioned in place of said reference beams of coherent light;
   q. inserting a half wave plate in the path of one of said polarized reference beams to effectuate an orthogonal rotation in its polarization;
   r. using spectacles with proper, orthogonally oriented, polarizing filters to observe the three-dimensional holographic stereomodel, which is subject to mensuration; and
   s. selectively aligning said polarized, coherent reference beams and/or said developed hologram plate to remove any residual y-parallax errors.

4. A method for holographic stereomodel construction according to claim 3 wherein said object beams of coherent light and said reference beams of coherent light are identically polarized.

5. A method for holographic stereomodel construction comprising the steps of:
   a. providing two diapositive transparencies of vertical or tilted photographs that are adapted for stereoscopic viewing by conventional means;
   b. illuminating said diapositives with an object beam of coherent light and providing projecting means to project them onto a translucent projection screen, said translucent projection screen being located between said diapositives and a covered hologram plate;
   c. adjusting said diapositives individually until relative orientation is obtained in the space of the stereomodel formed by said projecting means so that the image appears sharp and focused on said translucent projection screen;
   d. removing the X parallax by back and forth translation of said translucent projection screen without defocusing the images;
   e. removing the Y parallax by adjusting sad projecting means;
   f. projecting one diapositive on said translucent projection screen by the use of said coherent light object beam while said covered hologram plate is illuminated with a reference beam of coherent light, said reference beam incident to said hologram plate;

g. exposing said hologram plate to the interference of said object beam which passes through said translucent projection screen and said reference beam;

h. recoving said hologram plate after the proper length of exposure time;

i. projecting the second diapositive onto said translucent projection screen by the use of a coherent light object beam while said covered hologram plate is illuminated with a reference beam of coherent light, said reference beam being incident to said plate at an angle direction from the opposite side as for said first diapositive and in a symmetrical position;

j. exposing the same area of said hologram plate as exposed before to the interference of said reference beam and said object beam from said second diapositive which passes through said translucent projection screen;

k. developing said hologram plate by conventional procedures;

l. positioning said developed hologram plate in the same position as it was during the exposures but with said projectors and said translucent projection screen removed;

m. illuminating said developed hologram plate simultaneously with two identically polarized coherent reference beams that are respectively positioned in plate of said reference beams of coherent light;

n. inserting a half wave plate in the path of one of said polarized reference beams to effectuate an orthogonal rotation in its polarization;

o. using spectacles with proper, orthogonally oriented, polarizing filters to observe the three-dimensional holographic stereomodel, with is subject to mensuration; and p. selectively aligning said polarized, coherent reference beams and/or said developed hologram plate to remove any residual Y parallax errors.

6. A method for holographic stereomodel construction according to claim 5 wherein said object beams of coherent light and said reference beams of coherent light are identically polarized.

* * * * *

PO-1050
(5/69)

UNITED STATES PATENT OFFICE
CERTIFICATE OF CORRECTION

Patent No. 3,820,895    Dated   June 28, 1974

Inventor(s) Edward M. Mikhail; Warren H. Stevenson; Maurice K. Kurtz, Jr.; and N. Balasubramanian It is certified that error appears in the above-identified patent and that said Letters Patent are hereby corrected as shown below:

In the heading "[75] Inventors: Edward M. Mihail; Warren H. Stevenson; Maurice K. Kurtz, Jr., all of Lafayette, Ind." should read --[75] Inventors: Edward M. Mikhail; Warren H. Stevenson; Maurice K. Kurtz, Jr.; N. Balasubramanian, all of Lafayette, Ind.--.

Signed and sealed this 29th day of October 1974.

(SEAL)
Attest:

McCOY M. GIBSON JR.            C. MARSHALL DANN
Attesting Officer              Commissioner of Patents